United States Patent
Nungesser et al.

(10) Patent No.: US 6,418,741 B1
(45) Date of Patent: Jul. 16, 2002

(54) EXPANSION/CHECK VALVE ASSEMBLY INCLUDING A REVERSE FLOW RATE ADJUSTMENT DEVICE

(75) Inventors: Roy Nungesser, Oviedo, FL (US); Rafael Rodriguez, Mission, TX (US)

(73) Assignee: Parker Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/563,285

(22) Filed: May 3, 2000

(51) Int. Cl.$^7$ ................................................ F25B 41/04
(52) U.S. Cl. ........................................................ 62/225
(58) Field of Search ............................. 62/196.4, 225; 236/92 B

(56) References Cited

U.S. PATENT DOCUMENTS

| | | | |
|---|---|---|---|
| 2,786,336 A | 3/1957 | Lange ............................. 62/8 |
| 2,841,174 A | 7/1958 | Frye ......................... 137/514.5 |
| 2,960,998 A | 11/1960 | Sinker ......................... 137/542 |
| 3,252,297 A | 5/1966 | Leimbach ..................... 62/225 |
| 3,324,673 A | 6/1967 | Lindahl ........................ 62/196 |
| 3,343,564 A | 9/1967 | Peeples ....................... 137/539 |
| 3,367,362 A | 2/1968 | Hoffman ..................... 137/517 |
| 3,461,681 A | 8/1969 | Smith ............................ 62/81 |
| 3,699,778 A | 10/1972 | Orth ............................. 62/225 |
| 3,738,573 A | 6/1973 | Eschbaugh .................... 236/92 |
| 3,742,722 A | 7/1973 | Leimbach ..................... 62/225 |
| 3,756,273 A | 9/1973 | Hengesbach ................ 137/540 |
| 3,913,601 A | 10/1975 | Hanson ........................ 137/39 |
| 3,945,396 A | 3/1976 | Hengesbach ................ 137/496 |
| 4,095,742 A | 6/1978 | Schumacher ................ 236/924 |
| 4,106,691 A | 8/1978 | Nielsen ........................ 236/92 |
| 4,168,723 A | 9/1979 | Scheider ..................... 137/542 |
| 4,214,698 A | 7/1980 | Josefsson ..................... 236/42 |
| 4,271,864 A | 6/1981 | Neff ............................ 137/599 |
| 4,462,421 A | 7/1984 | Ross .......................... 137/542 |
| 4,606,199 A | 8/1986 | Gotzenberger ............... 62/225 |
| 4,769,550 A | 9/1988 | Krechel ...................... 137/542 |
| 4,852,364 A | 8/1989 | Seener ......................... 62/225 |
| 4,964,567 A | 10/1990 | Heffner ....................... 236/92 |
| 5,002,089 A | 3/1991 | Reedy ..................... 137/493.8 |
| 5,154,589 A | * 10/1992 | Ruhl et al. .................. 417/446 |
| 5,251,459 A | 10/1993 | Grass ........................ 62/324.1 |
| 5,575,158 A | * 11/1996 | Vogel ........................ 62/196.4 |
| 5,694,782 A | * 12/1997 | Alsenz ........................ 62/156 |

* cited by examiner

Primary Examiner—William E. Tapolcai
Assistant Examiner—Mohammad M Ali
(74) Attorney, Agent, or Firm—Renner, Otto, Boisselle & Sklar, LLP

(57) ABSTRACT

An expansion/check valve assembly is provided that includes a reverse flow rate adjustment device that allows for adjustment of the flow rate of a fluid flowing reversely through an open check valve port. The adjustment device includes a flow rate control member within the valve body and an adjustment member accessible outside of the valve body. The flow rate control member is operably coupled to the adjustment member and the adjustment member preferably includes a visual indicator viewable outside of the valve body to indicate the position of the flow rate control member. When installed in a refrigeration system at the inlet of the evaporator, the reverse flow rate adjustment device can be adjusted to control defrost conditions.

33 Claims, 5 Drawing Sheets

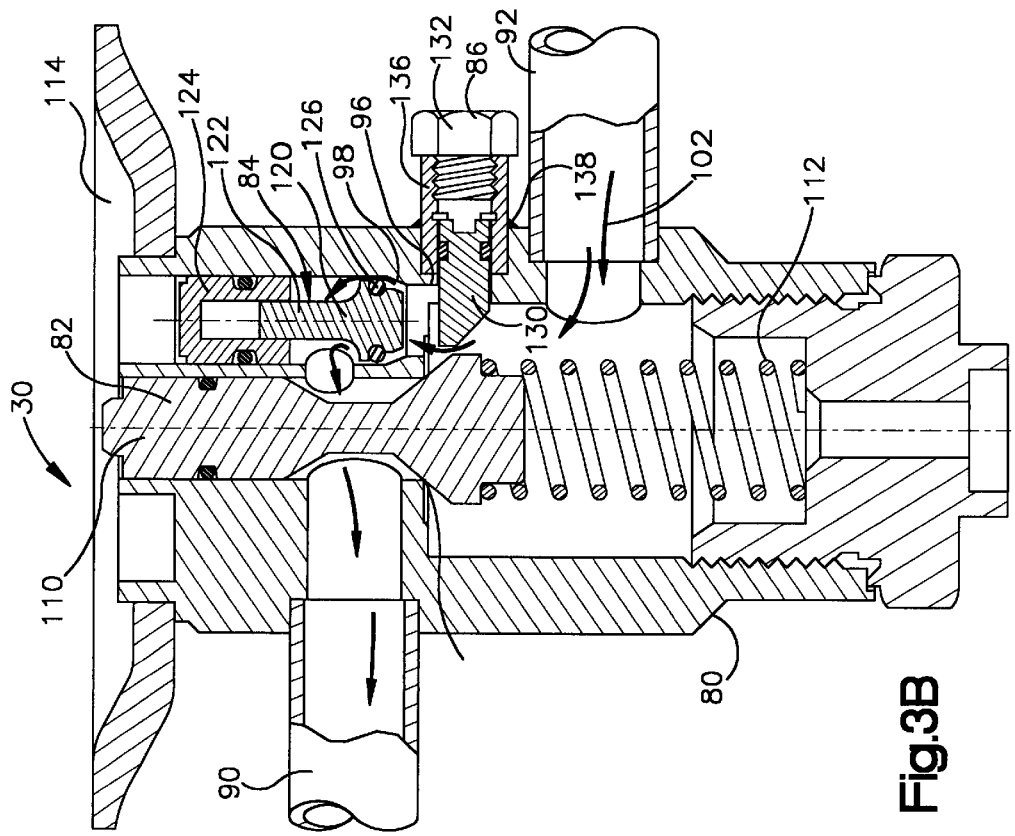
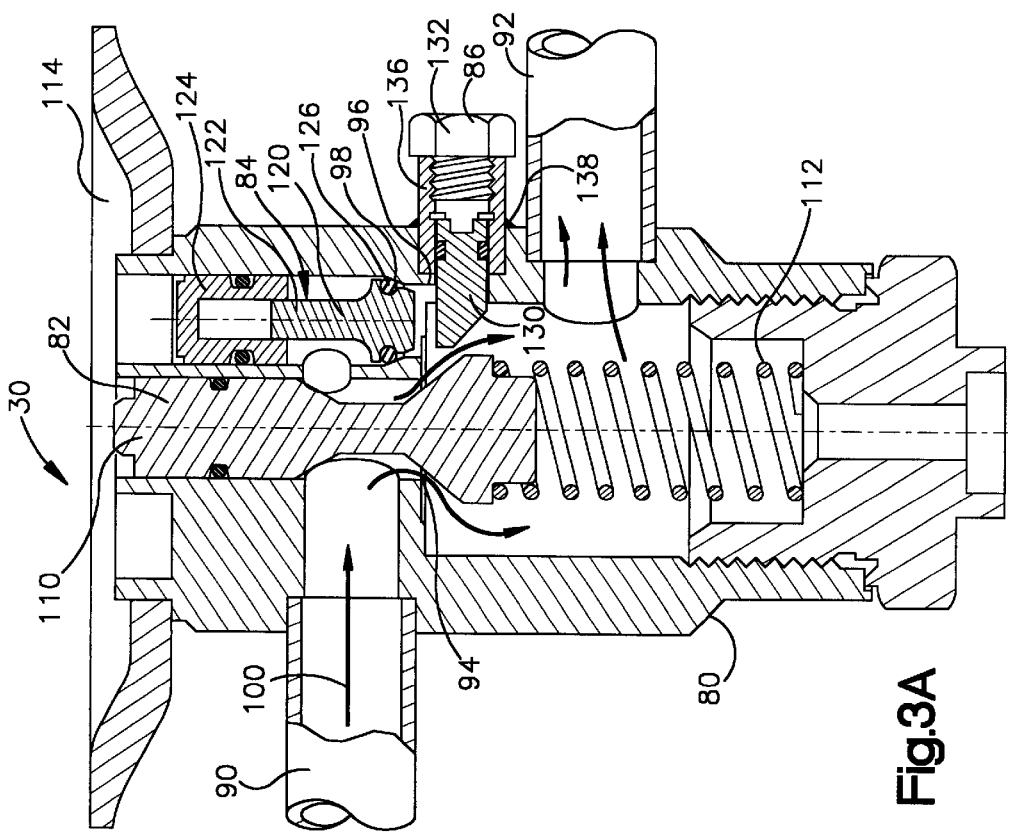
Fig.3A
Fig.3B

EXPANSION/CHECK VALVE ASSEMBLY INCLUDING A REVERSE FLOW RATE ADJUSTMENT DEVICE

FIELD OF THE INVENTION

The present invention relates generally as indicated to an expansion/check valve assembly including a reverse flow rate adjustment device and more particularly to a valve assembly that allows the flow rate of a fluid flowing reversely through an open check valve port to be selectively adjusted.

BACKGROUND OF THE INVENTION

One type of typical refrigeration system includes a compressor, a condenser, a receiver, and an evaporator. The compressor receives refrigerant vapor at a relatively low pressure and delivers it to the condenser at a relatively high pressure. The condenser liquefies the refrigerant and delivers it to the evaporator by way of the receiver. At the evaporator, the fluid evaporates and absorbs heat from the external surroundings thereby cooling the relevant environment. The evaporated refrigerant fluid is then delivered (via a suction line) to the compressor to complete the conventional refrigeration cycle.

An expansion or control valve is typically provided upstream of the inlet to the evaporator. This valve controls the flow of high pressure liquid refrigerant from the receiver and provides that it is delivered to the evaporator at a relatively low pressure. One type of expansion valve includes a metering valve member movable within the valve body to selectively open and close an expansion port in response to temperature and pressure changes in the refrigerant fluid discharged from the evaporator.

A large scale refrigeration system, such as for use in, for example, a supermarket setting, may include a plurality of evaporators. The evaporators are commonly arranged in a parallel relationship and an expansion valve is located at the inlet of each individual evaporator. During the cooling cycle, high pressure liquid refrigerant is provided to each of the evaporators from a common supply line and the evaporated refrigerant is returned to the compressor via a common suction line.

As indicated above, the function of the evaporator is to absorb heat from the relevant environment whereby it is commonly constructed of coils to maximize heat transfer area. If the evaporator's coils become covered with frost and/or ice, this reduces the heat transfer area thereby impairing the system's efficiency. For this reason, most refrigeration systems include the ability to initiate a defrosting cycle wherein the coils are temporarily "warmed" to remove the ice and frost therefrom.

One common defrosting method is to pass "warm" refrigerant fluid reversely through the evaporator coils. Specifically, refrigerant vapor from the discharge of the compressor is introduced to the outlet of the evaporator, passes reversely through the coils, exits the inlet of the evaporator, and returns to the compressor suction. In a large scale refrigeration system with parallel evaporators, the warm vapor from the compressor's discharge is introduced to the outlet of each of the individual evaporators through a common supply line.

During the defrosting cycle, the reversely flowing refrigerant fluid circumvents or bypasses the expansion valve. To this end, a bypass line may be provided, this bypass line including a check valve to insure that fluid circumvents the expansion valve only during the defrost mode. Such bypass lines usually require a significant amount of extra plumbing, especially in a large scale refrigeration system including a plurality of evaporators. Specifically, each separate check valve bypass line requires the installation of two tees, one on each side of the expansion device. This extra plumbing, and/or the multiple joints inherent in this plumbing, adds additional installation expenses, increases the possibility for leaks, and complicates infield service checks.

To eliminate the need for separate check valve bypass lines, a combined expansion/check valve assembly may be provided. Such a valve assembly is designed to control the flow during the cooling cycle while at the same time allowing for relatively unrestricted flow during the defrosting cycle. The expansion/check valve assembly typically includes a valve body, an expansion valve device, and a check valve device. The valve body defines a forward flow path through an expansion port and a reverse flow path through a check valve port. The expansion valve device opens and closes the expansion port to control flow rate through the forward flow path. The check valve device closes the check valve port to close the reverse flow path and opens the check valve port to open the reverse flow path.

In a large scale refrigeration system including parallel evaporators, the evaporators are varying distances from the compressor and thus varying distances from the supply of warm defrost gas. Consequently, the evaporators closest to the compressor tend to defrost faster than those farther away thereby causing an "unbalanced" defrost situation. This unbalanced defrost situation may result in the evaporators closest to the compressor being excessively warmed (and perhaps threatening the temperature of the product being refrigerated) and/or the evaporators farthest away from the compressor being inadequately defrosted.

If separate check valve bypass lines are used to circumvent the expansion valve, hand valves may be installed on the bypass lines to control the rate of flow therethrough. In this manner, the hand valves on the bypass lines for the evaporator(s) closer to the compressor could be opened a lesser amount than those hand valves on the bypass lines for the evaporator(s) farther away from the compressor. By appropriately setting the hand valves for the individual evaporators, it is possible to "balance" the warm defrost flow to all of the evaporators to more evenly and effectively defrost all of the evaporators. Significantly, the hand valves allow this balancing to be based on the actual defrost characteristics of the refrigeration system after it is up and running. Moreover, the hand valves can be reset when necessary to accommodate changes in the defrost characteristics due to, for example, an uneven load distribution among the different evaporators.

Accordingly, it is possible to "balance" the defrosting of parallel evaporators if separate check valve bypass lines are used. However, as was indicated above, it is usually preferred to eliminate such separate check valve bypass plumbing by using a combined expansion/check valve assembly. While such a valve assembly controls the reverse flow direction of the warm defrost gas, it is not possible to control the rate of this reverse flow. Thus, once the combined expansion/check valve assembly is installed in the refrigeration system, it is not believed to be possible and/or convenient to adjust the defrost flow rate through the different evaporators.

SUMMARY OF THE INVENTION

The present invention provides a combined expansion/check valve assembly which allows for adjustment of the flow rate during the reverse flow conditions. Specifically, the valve assembly of the present invention allows a manual adjustment of the reverse flow rate through the check valve. In this manner, it is possible to balance the defrosting of parallel evaporators based on the actual defrost characteristics of the refrigeration system and to refine this balancing when necessary to accommodate changes in the defrost characteristics. Thus, the valve assembly of the present invention provides manual on-line adjustments while still eliminating the need for separate check valve bypass plumbing.

More particularly, the present invention provides a valve assembly comprising a valve body, an expansion valve device, a check valve device and a reverse flow rate adjustment device. The valve body defines a forward flow path through an expansion port and a reverse flow path through a check valve port. The expansion valve device opens and closes the expansion port to control flow rate through the forward flow path. The check valve device closes the check valve port to close the reverse flow path and opens the check valve port to open the reverse flow path.

The reverse flow rate adjustment device controls flow rate through the reverse flow path when the check valve port is opened. Preferably, the adjustment device includes a flow rate control member within the valve body and an adjustment member accessible outside of the valve body. The flow rate control member is operably coupled to the adjustment member and the adjustment member preferably includes a visual indicator viewable outside of the valve body to indicate the position of the control member.

According to one embodiment of the invention, the flow rate control member may control the flow rate by selectively changing the flow area of the check valve port and, if so, is preferably positioned upstream of the check valve port. The flow rate control member preferably comprises a shaft operably coupled to the adjustment member. The shaft has either an inclined distal end surface or a stepped distal end surface that is positioned perpendicularly adjacent the check valve port in the maximum flow position and that is positioned perpendicularly opposite the check valve port in the minimum flow position. Alternatively, the shaft may have a transverse opening that is aligned with the reverse flow path through the check valve port in the maximum flow position and that is positioned perpendicular to the reverse flow path through the check valve port in the minimum flow position.

To move the flow rate member between a maximum flow position and a minimum flow position, the adjustment member is turned in a plane parallel to the reverse flow path through the check valve port. Preferably, the adjustment member is turned less than one full rotation to move the flow rate control member between the maximum flow position and the minimum flow position. Specifically, if the shaft has the inclined or stepped distal end surface, the adjustment member is turned 180° and if the shaft has the transverse opening, the adjustment member is turned 90°.

Instead of a shaft that rotates in a parallel plane, the flow rate control member may comprise a shaft that moves in a direction perpendicular to the reverse flow path through the check valve port. In this case, the adjustment member is turned a plurality of rotations to move the flow rate member between a maximum flow position to a minimum flow position. The shaft may have a flat distal end surface, a tapered distal end surface or a rounded distal end surface, depending on the desired flow patterns.

According to another embodiment of the invention, the flow rate control member controls the flow rate by selectively limiting the movement of a check valve member away from a check valve seat and is preferably positioned downstream of the check valve port. In this embodiment, the adjustment member is turned less than one full rotation (preferably 180°) to move the flow rate member between a maximum flow position and a minimum flow position. The flow rate control member comprises a shaft having a projection extending from its distal end. The projection holds the check valve member a certain distance away from the check valve seat in the maximum flow position and a lesser distance in the minimum flow position.

The valve assembly of the present invention may be installed in a refrigeration system at the inlet of the evaporator so that the reverse flow rate adjustment device can be adjusted to control flow rate through the reverse flow path and thereby control defrost conditions. Specifically, the refrigerant fluid is passed reversely through the evaporator whereby the check valve port is opened and the adjustment member is manipulated to control the flow rate through the reverse flow path. Also, a plurality of the valve assemblies may be installed in a large scale refrigeration system including a plurality of evaporators (e.g., in a parallel relationship) and the respective reverse flow rate adjustment devices adjusted to balance defrost conditions between the evaporators.

These and other features of the invention are fully described and particularly pointed out in the claims. The following description and annexed drawings set forth in detail certain illustrative embodiments of the invention, these embodiments being indicative of but a few of the various ways in which the principles of the invention may be employed.

DRAWINGS

FIGS. 3A and 3B are cross-sectional views of the valve assembly showing its forward flow path and its reverse flow path, respectively.

DETAILED DESCRIPTION

Figure 1:
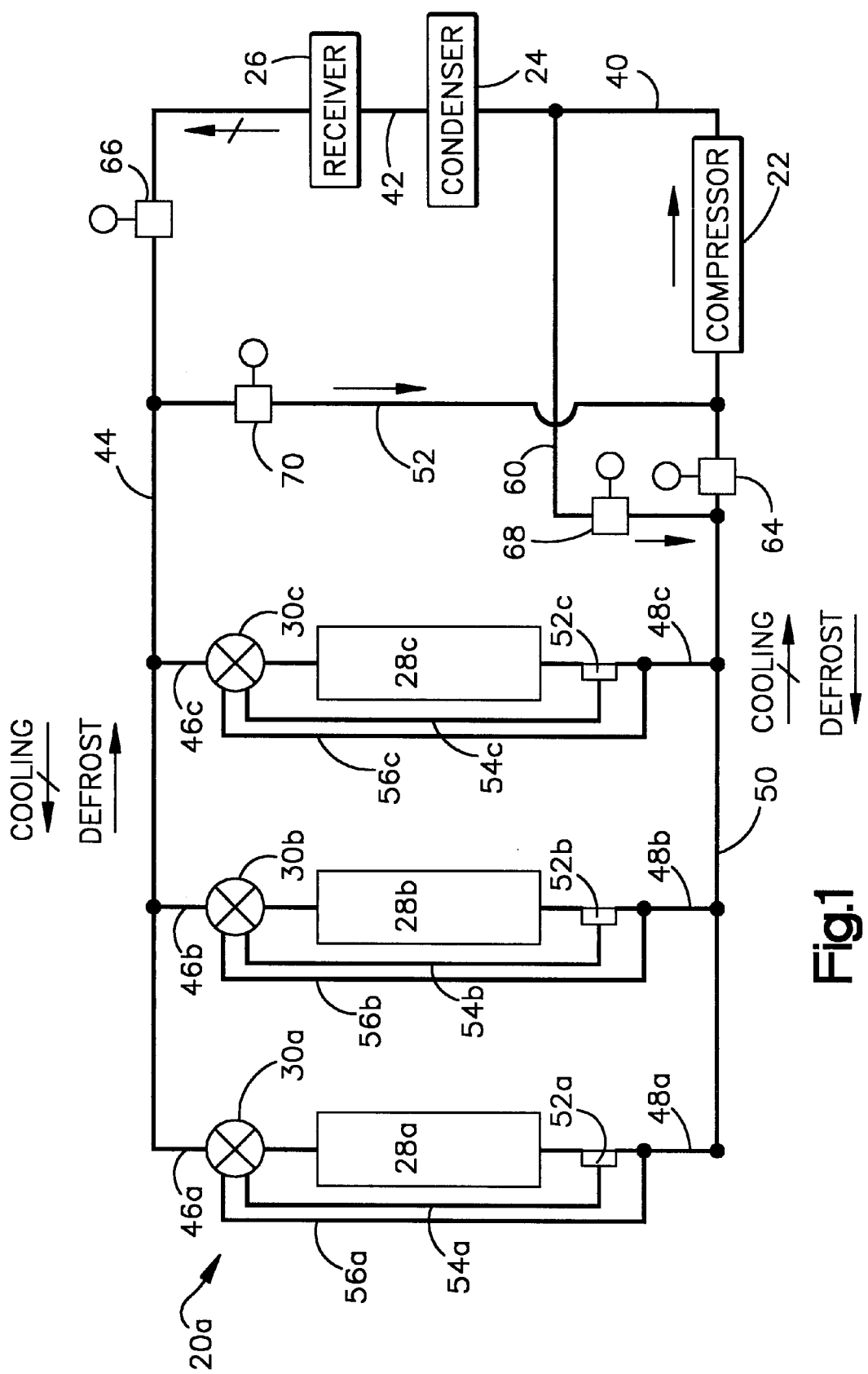
FIG. 1 is a schematic representation of a refrigeration system incorporating an expansion/check valve assembly according to the present invention, the valve assembly including an adjustment device that controls the reverse flow rate by selectively restricting the area of a check valve port.

A refrigeration system 20 according to the present invention is shown schematically in FIG. 1. The illustrated system 20 is a large scale refrigeration system for use in, for example, a supermarket setting. The system 20 comprises a compressor 22, a condenser 24, a receiver 26, and a plurality of evaporators 28a, 28b, and 28c arranged in a parallel relationship. An expansion/check valve assembly 30a/30b/30c according to the present invention is provided at the inlet of each of the evaporators 28. As is explained in more detail below, each of the valve assemblies 30 performs an expansion valve function when the system 20 is in a cooling cycle and performs a check valve function when the system 20 is in a defrosting cycle. Moreover, the valve assembly 30 allows adjustment of the flow rate during the defrosting cycle thereby making possible manual on-line adjustments while still eliminating the need for separate check valve bypass plumbing.

During the cooling cycle of the refrigeration system 20, the compressor 22 delivers refrigerant vapor at a relatively high pressure to the condenser 24 through a line 40. The condenser 24 liquefies the refrigerant and delivers it to the receiver 26 via line 42. A common supply line 44 provides the liquid refrigerant to the different evaporators 28 via inlet lines 46a, 46b and 46c on which the valve assemblies 30 are installed. At the evaporator 28, the fluid evaporates and absorbs heat from the external surroundings thereby "refrigerating" the relevant environment. The evaporated refrigerant fluid is then transported via outlet lines 48a, 48b, and 48c to a common suction line 50 which returns the fluid to the compressor 22 to complete the cycle.

The valve assemblies 30 each functions as an expansion device during the cooling cycle of the refrigeration system 20. Specifically, the valve assembly 30 controls the flow of high pressure liquid refrigerant from the receiver 26 and insures that the fluid is delivered to the evaporator 28 at a relatively low pressure. While in the illustrated embodiment the expansion device components are of a thermostatic type, the incorporation of other types of expansion devices into the valve assemblies is possible with and contemplated by the present invention.

In the illustrated embodiment, thermostatic bulbs 52a, 52b, and 52c are disposed in thermal responsive contact with the evaporator outlet lines 48a, 48b and 48c, respectively, and capillary tubes 54a, 54b, and 54c communicate with the valve assemblies 30a, 30b, and 30c. The bulbs 52 typically are filled with two phase volatile fluid and effectively sense changes in temperature of the refrigerant fluid discharged from the evaporator 28 to thereby control a component of the valve assembly 30 (namely a thermostatic head 114, introduced below). Also, equalizer tubes 56a, 56b and 56c optionally extend between the evaporator outlet lines 48 and the respective valve assemblies 30 to thereby insure that the expansion function of the valve assembly 30 will not be affected by large pressure drops across the evaporator 28.

During the defrosting cycle, refrigerant vapor from the discharge of the compressor 22 flows reversely through a bypass line 60 to the supply line 50 and then through the evaporator outlet lines 48. The warm vapor introduced to the outlet sides of the evaporators 28a, 28b and 28c flows reversely through the evaporators' coils and exits the inlet side of the evaporator 28 via the inlet lines 46a, 46b, and 46c. The refrigerant fluid flows reversely from the inlet lines 46 to the common supply line 44 and then through a bypass line 52 to the inlet of the compressor 22. Solenoid valves 64, 66, 68 and 70 are provided on the relevant lines for flow direction control. Specifically, during the cooling cycle, solenoid valves 64 and 66 are open and solenoid valves 68 and 70 are closed, and during the defrost cycle, valves 64 and 66 are closed and valves 68 and 70 are open.

Each of the valve assemblies 30 permits relatively unrestricted flow of the refrigerant fluid reversely through the evaporators 28 during the defrosting cycle (i.e., reverse flow conditions). Additionally, the valve assembly 30 allows a manual adjustment of the reverse flow rate through the evaporator 28. Thus, the valve assembly 30 not only controls the direction of the flow during reverse defrost conditions, but also the rate of this reverse flow. In this manner, it is possible to balance the defrosting of the parallel evaporators 28 based on the actual defrost characteristics of the refrigeration system 20 and to refine this balancing when necessary to accommodate changes in the defrost characteristics.

Figure 2:
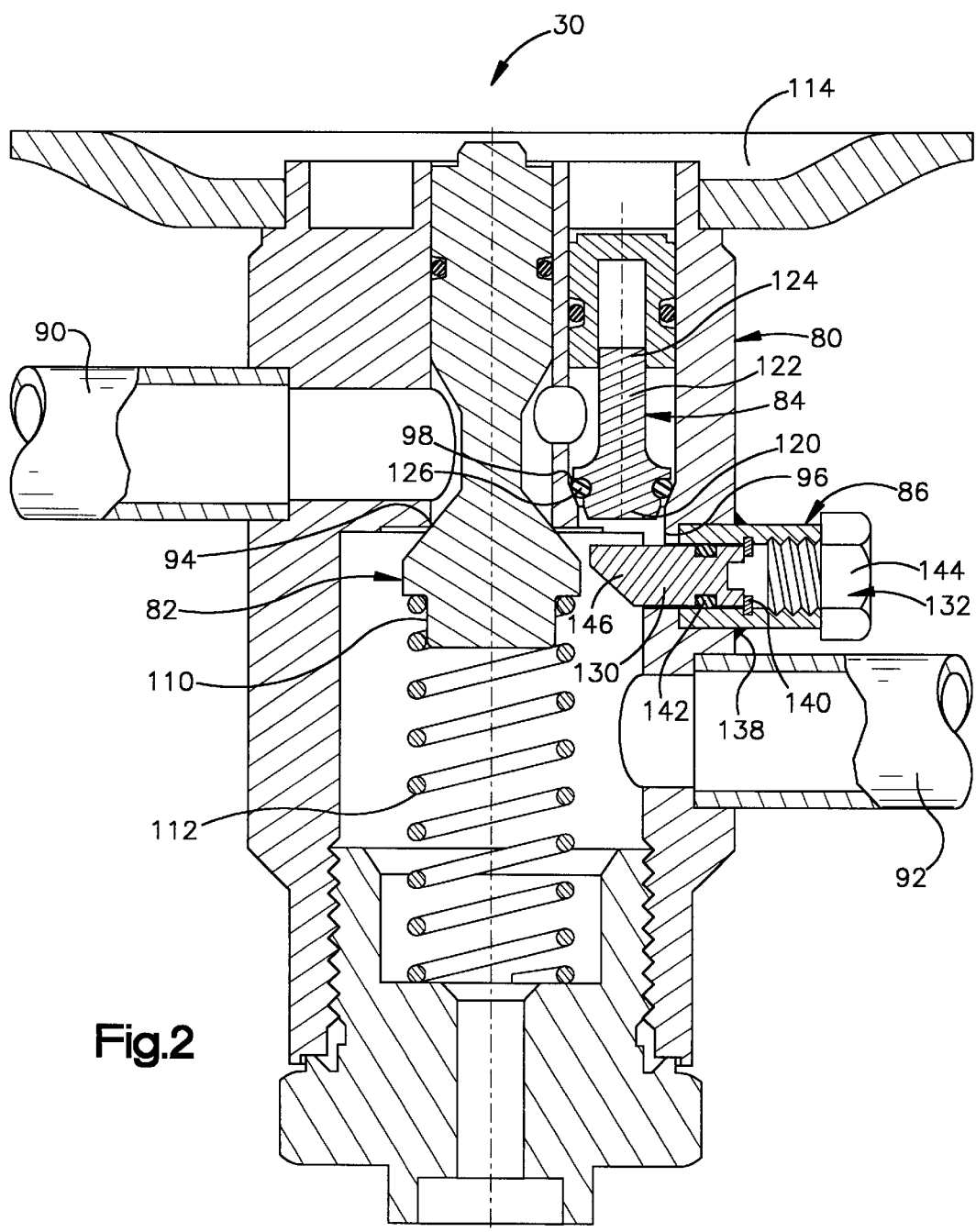
FIG. 2 is a cross-sectional view of the valve assembly showing the positioning of the reverse flow rate adjustment device.

Referring now to FIG. 2, the valve assembly 30 is shown in detail. The valve assembly 30 includes a valve body 80, an expansion valve device 82, a check valve device 84, and a reverse flow rate adjustment device 86. During the cooling cycle, or forward flow conditions, the check valve device 84 assures that the fluid interacts with the expansion valve device 82 and thereby adiabatically expands as it passes through the valve assembly 30. During the defrost cycle, or reverse flow conditions, the check valve device 84 permits the fluid to bypass the expansion valve device 82. As is explained in more detail below, the adjustment device 86 allows adjustment of flow rate when the fluid is bypassing the expansion valve device 82 during reverse flow conditions.

The valve body 80 includes an inlet 90 and an outlet 92. The inlet 90 is coupled to the inlet lines 46 and/or the common supply line 44 so that the valve assembly 30 receives the high pressure liquid refrigerant from the receiver 26 and/or the condenser 24. (FIG. 1.) The outlet 92 is coupled to the evaporator 28 (FIG. 1) so that it can receive the adiabatically expanded fluid from the valve assembly 30. The valve body 80 additionally includes an expansion port 94 and a check port 96. The expansion port 94 cooperates with the expansion valve device 82 during forward flow conditions. The check port 96 cooperates with the check valve device 84 to control the direction of flow through the valve assembly 30 and is surrounded by a valve seat 98.

As is best seen by referring additionally to FIGS. 3A and 3B, the valve body 80 defines a forward flow path 100 and a reverse flow path 102. In relation to the refrigeration system 20 (FIG. 1), the forward flow path 100 corresponds to the cooling cycle and the reverse flow path 102 corresponds to the defrosting cycle. The forward flow path 100 extends from the inlet 90 through the expansion port 94 to the outlet 92. (FIG. 3A.) The reverse flow path 102 extends from the outlet 92 through the check port 96 to the inlet 90. (FIG. 3B.)

The expansion valve device 82 includes a metering valve member 110, a compression spring 112, and a thermostatic head 114. The metering valve member 110 is movable within the valve body 80 to selectively open and close the expansion port 94. The compression spring 112 biases the valve member 110 to a closed position. Although not specifically shown and/or numbered in the drawing, the thermostatic head 114 is divided into an upper chamber and a lower chamber by a diaphragm. The upper chamber communicates with the bulb 52 and the capillary tube 54 and the lower chamber communicates with the equalizer tube 56. Changes in pressure differential between the upper and lower chambers are transmitted to the metering valve member 110 to move it away from the closed position to controllably meter refrigerant fluid through the expansion port 94.

The check valve device 84 includes a check valve member 120, a piston 122 and a piston guide 124. The check valve member 120 is movable within the valve body 80 towards and away from the valve seat 98 to close and open the check valve port 96. An O-ring 126 may be provided for sealing purposes when the check valve member 120 is in the closed position seated against the check valve seat 98 as is shown in FIG. 2. The piston 122 and the piston guide 124 are arranged so that, in forward flow conditions, the relatively high pressure of the inlet refrigerant fluid will force the check valve member 120 to the closed position whereat it is seated against the valve seat 98. In reverse flow conditions, the pressure of the fluid flowing the opposite direction will force the check valve member 120 away from the valve seat 98.

The adjustment device 86 includes a flow rate member 130 and an adjustment member 132. The members 132 and 134 are movably mounted within an enclosure 136 attached to the valve body 80 by, for example, a braze ring 138. Suitable retainers 140 and/or seals 142 are provided within the adjustment device 86.

The adjustment member 132 is accessible outside of the valve body 80 for manipulation of the flow rate member 130. To this end, the adjustment member 132 may include a knob 144 which may be turned (approximately 180° in the illustrated embodiment) to move the flow rate member 130 between a maximum flow position and a minimum flow position. Preferably, the knob 144 provides visual indication of the position of the flow rate member 130.

Figure 4A:
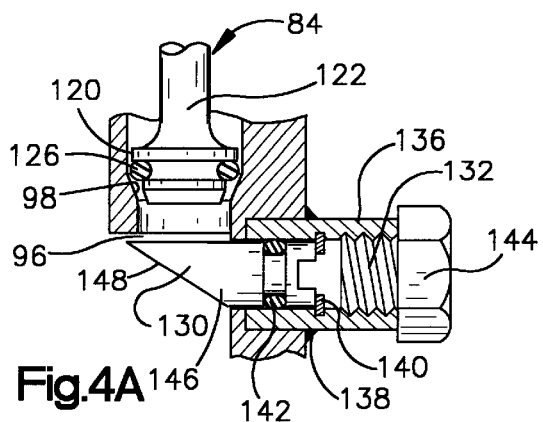
FIGS. 4A and 4B are enlarged portions of the cross-sectional view of FIG. 2 showing a flow rate member of the adjustment device in a maximum flow position and a minimum flow position, respectively.
Figure 4B:
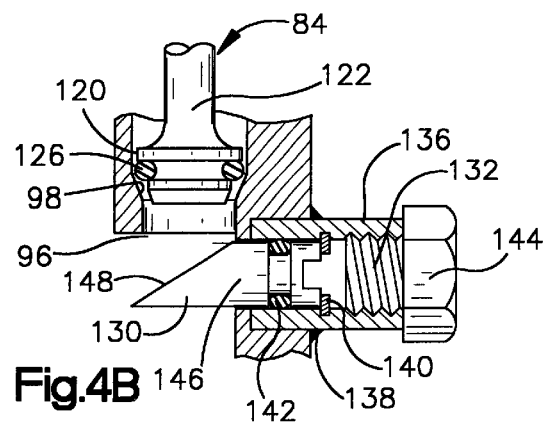

The flow rate member 130 shown in FIGS. 2 and 3 controls the reverse flow rate by selectively changing the flow area of the check valve port 96. As is best seen in FIGS. 4A and 4B, the flow rate member 130 comprises a tubular shaft 146 operably coupled to the adjustment member 132 and having an inclined surface 148. During adjustment of the device 86, the adjustment member 132 is turned less than one full rotation to move the flow rate member in a plane parallel to the reverse flow path through the check valve port 96 between a maximum flow position and a minimum flow position.

When the inclined surface 148 is adjacent the check valve port 96 a maximum amount of flow will pass therethrough. (FIG. 4A.) When the inclined surface 148 is in an opposite position (i.e, the adjustment member 132 is turned 180°), a minimum amount of flow will pass through the check valve port 96. (FIG. 4B.) At positions therebetween, varying amounts of flow will pass through the check valve port 96. Accordingly, by manually turning the adjustment member 132, the rate of reverse flow through the check valve port 96 may be changed or adjusted to accommodate a particular defrost situation.

Figure 5A:
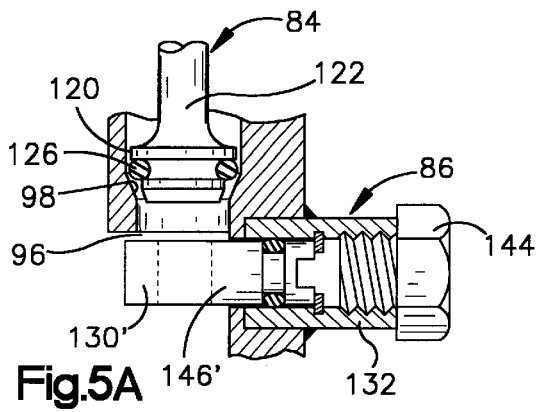
FIGS. 5A and 5B are views similar to FIGS. 4A and 4B with a modified flow rate member shown in a maximum flow position and a minimum flow position, respectively.
Figure 5B:
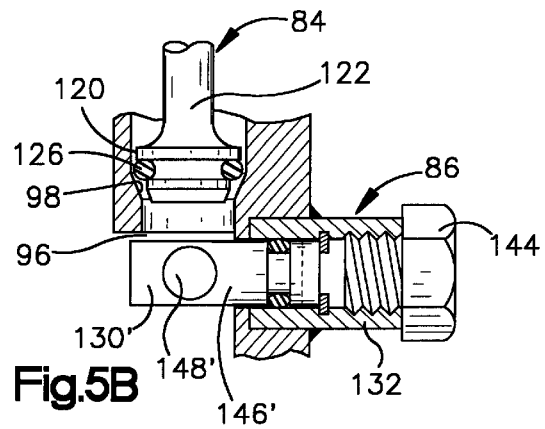
Figure 6A:
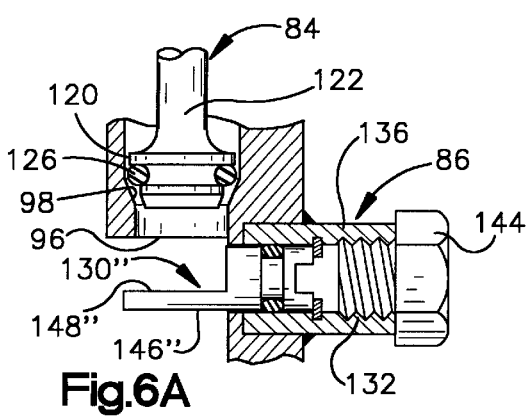
FIGS. 6A and 6B are views similar to FIGS. 4A and 4B with another modified flow rate member shown in a maximum flow position and a minimum flow position, respectively.
Figure 6B:
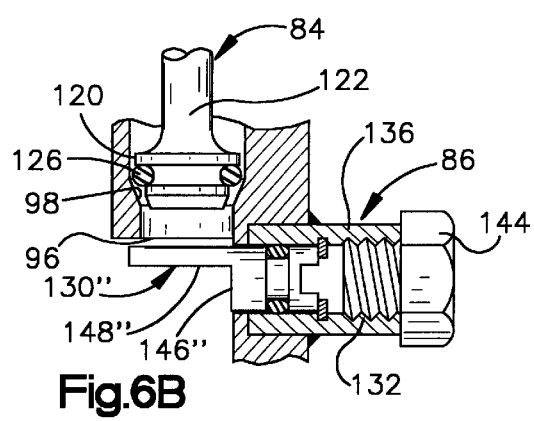

Modified versions of the flow rate member are shown in FIGS. 5 and 6. In FIG. 5, the flow rate member 130' comprises a tubular shaft 146' having an opening 148' extending transversely therethrough. For maximum reverse flow, the opening 148' is aligned with the check valve port 96. (FIG. 5A). For minimum reverse flow, the opening 148' is situated perpendicular to the check valve port (i.e., the adjustment member is rotated 90°). (FIG. 5B.) In FIG. 6, the flow rate member 130" comprises tubular shaft 146'" having a stepped distal end surface 148". When the stepped surface 148" is adjacent the check valve port 96, a maximum amount of flow will pass therethrough (FIG. 6A) and when the step is in an opposite position (i.e., the adjustment member is rotated 180°), a minimum amount of flow will pass therethrough (FIG. 6B).

Figure 7A:
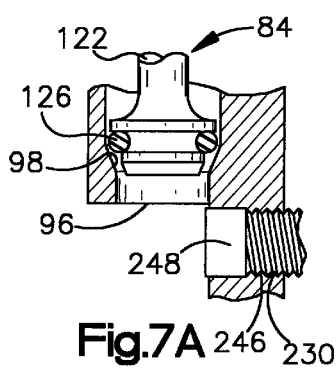
FIGS. 7A and 7B are views similar to FIGS. 4A and 4B with another modified flow rate member shown in a maximum flow position and a minimum flow position, respectively.
Figure 7B:
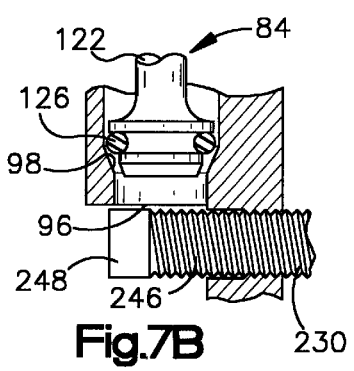
Figure 8A:
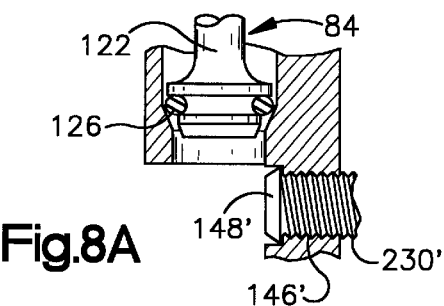
FIGS. 8A and 8B are views similar to FIGS. 4A and 4B with another modified flow rate member shown in a maximum flow position and a minimum flow position, respectively.
Figure 8B:
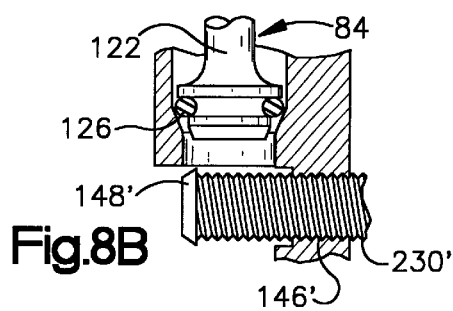
Figure 9A:
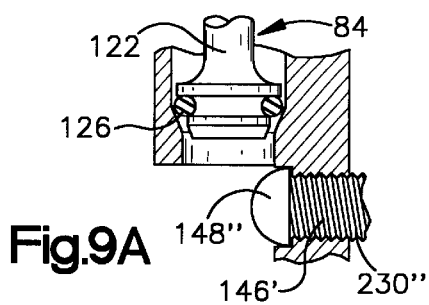
FIGS. 9A and 9B are views similar to FIGS. 4A and 4B with another modified flow rate member shown in a maximum flow position and a minimum flow position, respectively.
Figure 9B:
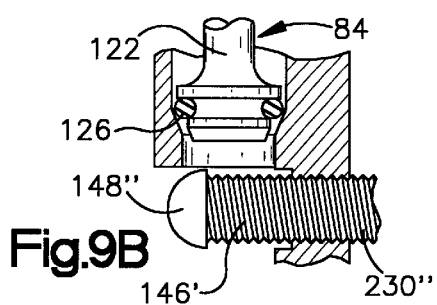

Another flow rate member 230 which may be incorporated into the reverse flow rate adjustment device 86 is shown in FIGS. 7A and 7B. The flow rate member 230 also controls the reverse flow rate by selectively changing the flow area of the check valve port 96. With this design, the adjustment member (not shown) is turned a series of rotations to move the flow rate member 230 in a direction perpendicular to the reverse flow path through the check valve port 96 between a maximum flow position and a minimum flow position. Preferably, the adjustment member would provide visual indication of the position of the flow rate member 230 by, for example, gauging the depth of the flow rate member 230 by bands or grooves in the adjustment member. In any event, the flow rate member 230 comprises a tubular shaft 246 having a flat distal end surface 248 that is moved in a direction perpendicular to reverse flow path through the check valve port 96 varying distances to change the effective flow area. A modified version 230' of the flow rate member includes a tapered distal end surface 248' (FIGS. 8A and 8B) and another modified version 230" of the flow rate member includes a rounded distal end surface 248" (FIGS. 9A and 9B).

Figure 10:
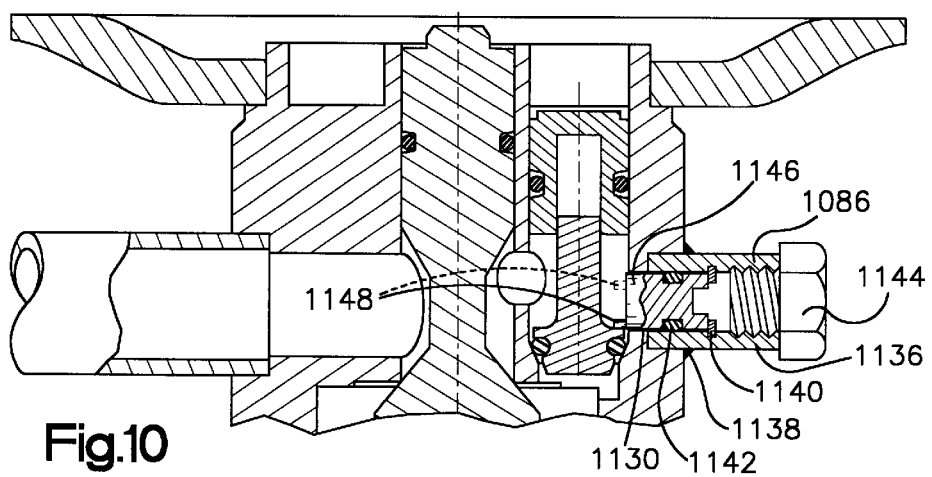
FIG. 10 is a cross-sectional view similar to FIG. 2 except that the valve assembly is shown with another reverse flow rate adjustment device, this device controlling the flow rate by selectively limiting the stroke of a check valve member.

Referring now to FIG. 10, the valve assembly 30 is shown incorporating a reverse flow rate device 1086 according to another embodiment of the invention. The device 1086 is similar to the device 86 in many ways. Specifically, the device 1086 includes a flow rate member 1130 and an adjustment member 1132 movably mounted within an enclosure 1136 attached to the valve body 80 by a braze ring 1138. Suitable retainers 1140 and/or seals 1142 are provided within the adjustment device 1086. Also, the adjustment member 1132 includes a knob 1144 which may be turned (approximately 180° in the illustrated embodiment) to move the flow rate member 1130 between a maximum flow position and a minimum flow position and the knob 1144 preferably provides visual indication of the position of the flow rate member 1130.

Figures 11A, 11B:
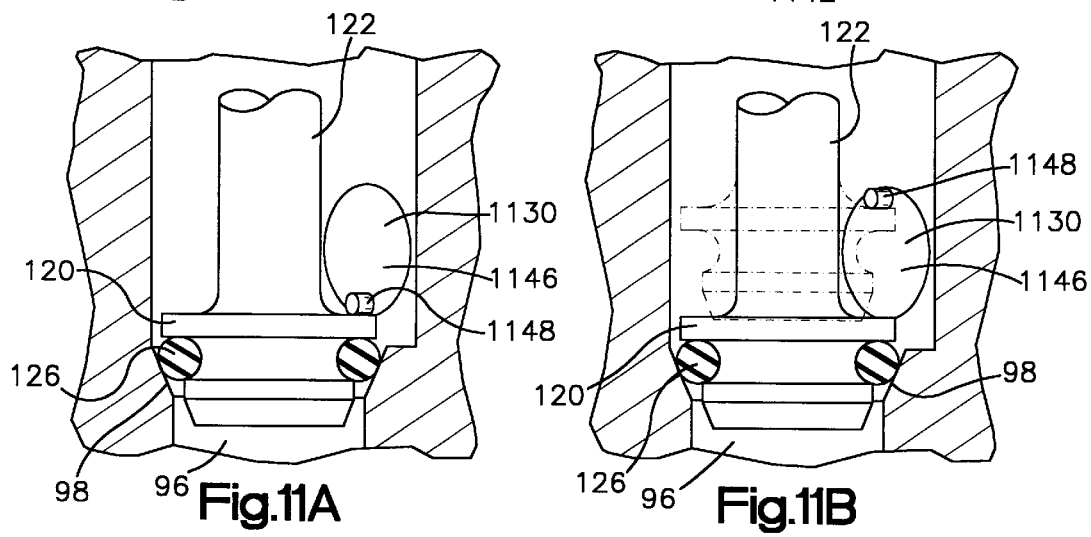
FIGS. 11A and 11B are enlarged portions of the cross-sectional view of FIG. 10 showing a flow rate member of the adjustment device in a maximum flow position and a minimum flow position, respectively.

In the reverse flow rate device 86, the enclosure 136 is situated to position the flow rate member 130 upstream of the check valve port 96 to selectively restrict flow rate therethrough. By comparison, in the reverse flow rate device 1086, the enclosure 1036 is situated to position the flow rate member 1130 downstream of the check valve port 96 to selectively limit the movement of the check valve member 120 away from the check valve seat 98 to selectively restrict the flow rate through the check valve port 96. As is best seen in FIGS. 11A and 11B the flow rate member 1130 comprises a tubular shaft 1146 having a protrusion 1148 extending outward from its distal end surface. When the protrusion 1148 is positioned (by rotating the adjustment member 1130) at an upper position, a maximum amount of flow will pass through the check valve port 96. (FIG. 11A.) When the protrusion 1148 is positioned at a lower position, a minimum amount of flow will pass therethrough. (FIG. 11B.)

One may now appreciate that the valve assembly 30 provides for adjustment of the flow rate through the check valve port 96 during reverse flow conditions. The valve assembly 30 may be installed in any heating, cooling and/or refrigeration system wherein it is desirable to control reverse flow conditions. With reference to the illustrated and preferred refrigeration system, the valve assembly 30 may be used to control reverse flow conditions during the defrosting cycle. With particular reference to a large scale refrigeration system (such as the system 20 shown in FIG. 1), the valve assembly 30 allows manual on-line adjustments to "balance" the defrosting of different evaporators while still eliminating the need for valve bypass plumbing.

It is noted that any directional reference in this description (such as upper, lower, etc.) simply relates to the orientation of the drawings and is used only for the sake of ease in explanation. The invention is not limited to any particular orientation of the valve assembly 30, the valve body 80, and/or the devices 82/84/86. Also, when the terms "upstream" and/or "downstream" are used in connection with the adjustment device 86/1086, these terms refer to the stream of flow in the reverse direction.

It is further noted that "forward flow path" corresponds to the fluid flow path when the check valve port is closed and "reverse flow path" corresponds to the fluid flow path when the check valve port is opened, regardless of the system in which the valve assembly is installed. It is conceivable that in certain installations (such as perhaps a heat pump system), an overall system would be considered to be in a forward flow condition when the relevant check valve port is open and/or would be considered to be in a reverse flow condition when the relevant check valve port is closed. Nonetheless, for the purposes of the present invention, forward flow path and reverse flow path are defined by the whether the relevant check valve port is closed or opened, respectively.

Although the invention has been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the following claims.

What is claimed:

1. A valve assembly comprising:
    a valve body defining a forward flow path between an inlet and an outlet and through an expansion port and defining a reverse flow path between the outlet and the inlet and through a check valve port;
    an expansion valve device that opens and closes the expansion port to control flow rate through the forward flow path;
    a check valve device that closes the check valve port to close the reverse flow path and that opens the check valve port to open the reverse flow path; and
    a reverse flow rate adjustment device that controls flow rate through the reverse flow path when the check valve port is opened.

2. The valve assembly as set forth in claim 1, wherein the adjustment device includes a flow rate control member within the valve body and an adjustment member accessible outside of the valve body and wherein the flow rate control member is operably coupled to the adjustment member.

3. The valve assembly as set forth in claim 2, wherein the adjustment member includes a visual indicator viewable outside of the valve body to indicate the position of the control member.

4. The valve assembly as set forth in claim 3, wherein the check valve device comprises a check valve member that is movable within the valve body towards and away from a valve seat to close and open the check valve port and wherein the flow rate control member selectively changes the flow area of the check valve port to thereby control the flow rate without contacting the check valve member.

5. The valve assembly as set forth in claim 4, wherein the flow rate control member is positioned upstream of the check valve port relative to the reverse flow path.

6. The valve assembly as set forth in claim 3, wherein the flow rate control member selectively changes the flow area of the check valve port to thereby control the flow rate, and wherein the adjustment member is turned a plurality of rotations to move the flow rate member between a maximum flow position and a minimum flow position.

7. The valve assembly as set forth in claim 6, wherein the flow rate control member comprises a shaft that is moved in a direction perpendicular to the reverse flow path through the check valve port.

8. The valve assembly as set forth in claim 3, wherein the check valve device comprises a check valve member movable within the valve body towards and away from a check valve seat surrounding the check valve port and wherein the flow rate control member selectively limits the movement of the check valve member away from the check valve seat.

9. The valve assembly as set forth in claim 8, wherein the flow rate control member is positioned downstream of the check valve port relative to the reverse flow path.

10. A refrigeration system comprising an evaporator and a valve assembly as set forth in claim 1 positioned at the inlet of the evaporator so that the reverse flow rate adjustment device can be adjusted to control flow rate through the reverse flow path when the check valve port is opened and thereby control defrost conditions.

11. A refrigeration system comprising a plurality of evaporators and a valve assembly as set forth in claim 1 positioned at the inlet of each of the evaporators so that the reverse flow rate adjustment devices can be adjusted to control flow rates through the reverse flow paths when the check valve ports are opened and thereby balance defrost conditions between the evaporators.

12. A refrigeration system as set forth in claim 11, wherein the evaporators are arranged in a parallel relationship.

13. A method of controlling defrost conditions in a refrigeration system including an evaporator and a valve assembly as set forth in claim 2 positioned at the inlet of the evaporator, said method comprising the steps of:
    passing a refrigerant fluid reversely through the evaporator; and
    manipulating the adjustment member to control flow rate through the reverse flow path.

14. A method of balancing defrost conditions in a refrigeration system comprising a plurality of evaporators and a valve assembly as set forth in claim 1 positioned at the inlet of each of the evaporators, said method comprising the steps of:
    passing refrigerant fluid reversely through each of the evaporators; and
    manipulating the respective reverse flow rate adjustment devices to adjust the flow rates through the respective reverse flow paths.

15. The valve assembly as set forth in claim 1, wherein the adjustment device includes a flow rate control member within the valve body which is movable between a maximum flow position and a minimum flow position to control flow rate through the reverse flow path when the check valve port is opened and wherein the check valve device can close the check valve port to close the reverse flow path regardless of the position of the flow rate control member.

16. The valve assembly as set forth in claim 15, wherein the check valve device can close the check valve port to close the reverse flow path when the flow rate control member is in the maximum flow position.

17. The valve assembly as set forth in claim 15, wherein the flow rate control member selectively controls the flow rate without contacting the check valve member.

18. The valve assembly as set forth in claim 1, wherein the check valve device comprises a check valve member that is movable within the valve body towards and away from a valve seat to close and open the check valve port and wherein the adjustment device comprises a flow rate control member which selectively controls the flow rate without contacting the check valve member.

19. A valve assembly comprising:
   a valve body defining a forward flow path between an inlet and an outlet and through an expansion port and defining a reverse flow path between the outlet and the inlet and through a check valve port;
   an expansion valve device that opens and closes the expansion port to control flow rate through the forward flow path;
   a check valve device that closes the check valve port to close the reverse flow path and that opens the check valve port to open the reverse flow path; and
   a reverse flow rate adjustment device that controls flow rate through the reverse flow path when the check valve port is opened;
   wherein the adjustment device includes a flow rate control member within the valve body and an adjustment member accessible outside of the valve body and wherein the flow rate control member is operably coupled to the adjustment member;
   wherein the adjustment member includes a visual indicator viewable outside of the valve body to indicate the position of the control member;
   wherein the flow rate control member selectively changes the flow area of the check valve port to thereby control the flow rate; and
   wherein the adjustment member is turned less than one full rotation to move the flow rate member in a plane parallel to the reverse flow path through the check valve port between a maximum flow position and a minimum flow position.

20. The valve assembly as set forth in claim 19, wherein the adjustment member is turned approximately 180° or less to move the flow rate member between the maximum flow position and the minimum flow position.

21. The valve assembly as set forth in claim 20, wherein the flow rate control member comprises a shaft operably coupled to the adjustment member and wherein the shaft has an inclined distal end surface that is positioned perpendicularly adjacent the check valve port in the maximum flow position and that is positioned perpendicularly opposite the check valve port in the minimum flow position.

22. The valve assembly as set forth in claim 20, wherein the flow rate control member comprises a shaft operably coupled to the adjustment member and wherein the shaft has a stepped distal end surface that is positioned perpendicularly adjacent the check valve port in the maximum flow position and that is positioned perpendicularly opposite the check valve port in the minimum flow position.

23. The valve assembly as set forth in claim 19, wherein the adjustment member is turned approximately 90° or less to move the flow rate member between the maximum flow position and the minimum flow position.

24. The valve assembly as set forth in claim 23, wherein the flow rate control member comprises a shaft operably coupled to the adjustment member and wherein the shaft has a transverse opening therethrough that is aligned with the reverse flow path through the check valve port in the maximum flow position and that is positioned perpendicular to the reverse flow path through the check valve port in the minimum flow position.

25. A valve assembly comprising:
   a valve body defining a forward flow path between an inlet and an outlet and through an expansion port and defining a reverse flow path between the outlet and the inlet and through a check valve port;
   an expansion valve device that opens and closes the expansion port to control flow rate through the forward flow path;
   a check valve device that closes the check valve port to close the reverse flow path and that opens the check valve port to open the reverse flow path; and
   a reverse flow rate adjustment device that controls flow rate through the reverse flow path when the check valve port is opened;
   wherein the adjustment device includes a flow rate control member within the valve body and an adjustment member accessible outside of the valve body and wherein the flow rate control member is operably coupled to the adjustment member;
   wherein the adjustment member includes a visual indicator viewable outside of the valve body to indicate the position of the control member;
   wherein the flow rate control member selectively changes the flow area of the check valve port to thereby control the flow rate;
   wherein the adjustment member is turned a plurality of rotations to move the flow rate member between a maximum flow position and a minimum flow position;
   wherein the flow rate control member comprises a shaft that is moved in a direction perpendicular to the reverse flow path through the check valve port; and
   wherein the shaft has a flat distal end surface.

26. A valve assembly comprising:
   a valve body defining a forward flow path between an inlet and an outlet and through an expansion port and defining a reverse flow path between the outlet and the inlet and through a check valve port;
   an expansion valve device that opens and closes the expansion port to control flow rate through the forward flow path;
   a check valve device that closes the check valve port to close the reverse flow path and that opens the check valve port to open the reverse flow path; and
   a reverse flow rate adjustment device that controls flow rate through the reverse flow path when the check valve port is opened;
   wherein the adjustment device includes a flow rate control member within the valve body and an adjustment member accessible outside of the valve body and wherein the flow rate control member is operably coupled to the adjustment member;
   wherein the adjustment member includes a visual indicator viewable outside of the valve body to indicate the position of the control member;
   wherein the flow rate control member selectively changes the flow area of the check valve port to thereby control the flow rate;

wherein the adjustment member is turned a plurality of rotations to move the flow rate member between a maximum flow position and a minimum flow position;

wherein the flow rate control member comprises a shaft that is moved in a direction perpendicular to the reverse flow path through the check valve port; and wherein the shaft has a tapered distal end surface.

27. A valve assembly comprising:

a valve body defining a forward flow path between an inlet and an outlet and through an expansion port and defining a reverse flow path between the outlet and the inlet and through a check valve port;

an expansion valve device that opens and closes the expansion port to control flow rate through the forward flow path;

a check valve device that closes the check valve port to close the reverse flow path and that opens the check valve port to open the reverse flow path; and a reverse flow rate adjustment device that controls flow rate through the reverse flow path when the check valve port is opened;

wherein the adjustment device includes a flow rate control member within the valve body and an adjustment member accessible outside of the valve body and wherein the flow rate control member is operably coupled to the adjustment member;

wherein the adjustment member includes a visual indicator viewable outside of the valve body to indicate the position of the control member;

wherein the flow rate control member selectively changes the flow area of the check valve port to thereby control the flow rate;

wherein the adjustment member is turned a plurality of rotations to move the flow rate member between a maximum flow position and a minimum flow position;

wherein the flow rate control member comprises a shaft that is moved in a direction perpendicular to the reverse flow path through the check valve port; and wherein the shaft has a rounded distal end surface.

28. A valve assembly comprising:

a valve body defining a forward flow path between an inlet and an outlet and through an expansion port and defining a reverse flow path between the outlet and the inlet and through a check valve port;

an expansion valve device that opens and closes the expansion port to control flow rate through the forward flow path;

a check valve device that closes the check valve port to close the reverse flow path and that opens the check valve port to open the reverse flow path; and a reverse flow rate adjustment device that controls flow rate through the reverse flow path when the check valve port is opened;

wherein the adjustment device includes a flow rate control member within the valve body and an adjustment member accessible outside of the valve body and wherein the flow rate control member is operably coupled to the adjustment member;

wherein the adjustment member includes a visual indicator viewable outside of the valve body to indicate the position of the control member;

wherein the check valve device comprises a check valve member movable within the valve body towards and away from a check valve seat surrounding the check valve port and wherein the flow rate control member selectively limits the movement of the check valve member away from the check valve seat;

wherein the flow rate control member is positioned downstream of the check valve port relative to the reverse flow path; and wherein the adjustment member is turned less than one full rotation to move the flow rate member between a maximum flow position and a minimum flow position.

29. The valve assembly as set forth in claim 28 wherein the adjustment member is turned approximately 180° to move the flow rate member between the maximum flow position and the minimum flow position.

30. The valve assembly as set forth in claim 29 wherein the reverse flow rate adjustment device further comprises a shaft operably coupled to the adjustment member and wherein the shaft has a projection extending from its distal end that holds the check valve member a certain distance away from the check valve seat in the maximum flow position and a lesser distance in the minimum flow position.

31. A valve assembly comprising:

a valve body defining a forward flow path between an inlet and an outlet and through an expansion port and defining a reverse flow path between the outlet and the inlet and through a check valve port;

means for opening and closing the expansion port to control flow rate through the forward flow path;

means for closing the check valve port to close the reverse flow path and that opens the check valve port to open the reverse flow path; and means for controlling flow rate through the reverse flow path when the check valve port is opened.

32. A valve assembly comprising:

a valve body defining a forward flow path between an inlet and an outlet and through an expansion port and defining a reverse flow path between the outlet and the inlet and through a check valve port;

a metering valve member movable within the valve body to selectively open and close the expansion port to control flow rate through the forward flow path;

a check valve member movable within the valve body towards and away from a check valve seat surrounding the check valve port to open and close the reverse flow path; and a flow rate control member movable within the valve body to selectively change the flow area of the check valve port to thereby control the flow rate through the reverse flow path when the check valve port is opened.

33. A valve assembly comprising:

a valve body defining a forward flow path between an inlet and an outlet and through an expansion port and defining a reverse flow path between the outlet and the inlet and through a check valve port;

a metering valve member movable within the valve body to selectively open and close the expansion port to control flow rate through the forward flow path;

a check valve member movable within the valve body towards and away from a check valve seat surrounding the check valve port to open and close the reverse flow path; and a flow rate control member movable within the valve body to selectively limit the movement of the check valve member away from the check valve seat to thereby control the flow rate through the reverse flow path when the check valve port is opened.

* * * * *

UNITED STATES PATENT AND TRADEMARK OFFICE
CERTIFICATE OF CORRECTION

PATENT NO.   : 6,418,741 B1
DATED        : July 16, 2002
INVENTOR(S)  : Nungesser et al.

It is certified that error appears in the above-identified patent and that said Letters Patent is hereby corrected as shown below:

<u>Title page,</u>
Item [60], insert as follows:
-- Related U.S. Application Data
[60]    Provisional application No. 60/150,251, filed on Aug. 23, 1999. --

<u>Column 1,</u>
Line 5, insert the following:
-- RELATED APPLICATIONS
      This application is a conversion of U.S. Provisional Application No. 60/150,251 filed on Aug. 23, 1999 under 35 U.S.C. §119(e). --

Signed and Sealed this

Twenty-sixth Day of November, 2002

*Attest:*

*Attesting Officer*

JAMES E. ROGAN
*Director of the United States Patent and Trademark Office*